US011883748B2

(12) United States Patent
Yang et al.

(10) Patent No.: US 11,883,748 B2
(45) Date of Patent: Jan. 30, 2024

(54) FRACTIONAL NON-FUNGIBLE TOKEN FOR GAME RELATED DIGITAL ASSETS

(71) Applicant: Sony Interactive Entertainment Inc., Tokyo (JP)

(72) Inventors: Yiwei Yang, San Mateo, CA (US); Matt Tomczek, San Mateo, CA (US); Jon Webb, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 29 days.

(21) Appl. No.: 17/514,452

(22) Filed: Oct. 29, 2021

(65) Prior Publication Data

US 2023/0138023 A1 May 4, 2023

(51) Int. Cl.
*A63F 13/77* (2014.01)
*A63F 13/79* (2014.01)
*A63F 13/792* (2014.01)
*A63F 13/86* (2014.01)
*H04L 9/00* (2022.01)
*G06F 21/60* (2013.01)

(52) U.S. Cl.
CPC ............ *A63F 13/77* (2014.09); *A63F 13/79* (2014.09); *A63F 13/792* (2014.09); *A63F 13/86* (2014.09); *G06F 21/602* (2013.01); *H04L 9/50* (2022.05); *A63F 2300/575* (2013.01); *A63F 2300/577* (2013.01)

(58) Field of Classification Search
None
See application file for complete search history.

(56) References Cited

U.S. PATENT DOCUMENTS

| 10,946,283 | B1 * | 3/2021 | Meilich | G06Q 20/3674 |
| 2021/0118085 | A1 * | 4/2021 | Bushnell | H04L 9/50 |
| 2022/0016529 | A1 * | 1/2022 | Meilich | A63F 13/792 |

FOREIGN PATENT DOCUMENTS

WO 2009094611 A2 7/2009

OTHER PUBLICATIONS

Arben Kane, Fractionalized NFT (F-NFTs): All That You Need To Know, https://medium.com/@arbenk/fractionalized-nft-f-nfts-all-that-you-need-to-know-46bc06ea486d, Sep. 9, 2021.*

(Continued)

*Primary Examiner* — Jason T Yen
(74) *Attorney, Agent, or Firm* — Penilla IP, APC (57) ABSTRACT

Methods and systems are provided for fractionalizing non-fungible token (NFT) shares for digital game assets. The method includes generating a digital asset depicting a gaming event associated with a game. The method includes obtaining a non-fungible token (NFT) for the digital asset. The NFT is stored in a block chain with a reference to a storage location of said digital asset. The obtaining of the NFT includes instructions or parameters for fractionalizing said NFT. The fractionalizing of the NFT creates a set of shares of the NFT. The method includes assigning a share the NFT to a user of the online gaming system. The share is exchangeable among a community of users. The method includes tracking use of each of the set of shares of the NFT and applying a value indicator to each share by the online gaming system.

15 Claims, 5 Drawing Sheets

(56) References Cited

OTHER PUBLICATIONS

Jack Yap, NFTs Are Booming In Popularity 6 Key Metrics Investors Can Use To Evaluate NFT Projects, https://chaindebrief.com/metrics-nft-investors-can-use-to-evaluate-projects/, Aug. 24, 2021.*
Notification of Transmittal of the ISR & Written Opinion PCT/US2022/045942, and the Written Opinion, dated Feb. 6, 2023.
Wang et al. "Non-Fungible Token (NFT): Overview, Evaluation, Opportunities and Challenges", Cornell University, Ithaca, NY 14853, Oct. 25, 2021, XP 091066331, entire document.

* cited by examiner

FRACTIONAL NON-FUNGIBLE TOKEN FOR GAME RELATED DIGITAL ASSETS

1. FIELD OF THE DISCLOSURE

The present disclosure relates generally to generation and use of game related digital assets and use of non-fungible tokens for said digital assets.

BACKGROUND

2. Description of the Related Art

The video game industry has seen many changes over the years. In recent years, social media has increased the popularity of gaming as well as the notoriety of some gamers. Often, popular gamers attract spectators that wish to see unique gaming moves, techniques for playing or simply to watch videos of the gamer playing certain games. Sometimes, gamers will advertise to their followers when they will be playing, and one or more followers may login to the sessions to view and learn or interact with other followers or players. In the context of gaming, gamers and/or followers may create digital media. This digital media may be created during game play or when interacting with other users in relation to a game. Sometimes, the generated digital media may be a recording of some part of a game play or some interesting event or action that occurred during the game. Regardless of how the digital media is created, views of digital media may not appreciate the significance of the media and/or may attempt to use the digital media without permission or authorization of the creator that generated the digital media.

It is in this context that implementations of the disclosure arise.

SUMMARY

Implementations for the present disclosure include methods and system for managing digital media that is generated by a creator. Digital media may include any content that is viewable or audible when rendered by a computing device. In one example, a video game player may play a game, and the way the player plays the game to achieve some action or goal can be represented by a video clip of the game showing the gaming actions. Thus, although the player did not create the game, the gameplay of the player includes, for example, moves, actions, points scored, interacts with content or maneuvers, spectator views, game shares, chat interactions, etc. In one configuration, the gameplay, if recorded into a video clip or sharable piece of gaming content, can represent digital media created by the player.

In some situations, an event may occur where a player may achieve a significant goal, perform a unique challenge, etc., and a recording, e.g., a video clip, of that event may be generated. The video clip, in this example, is digital media that is created in response to the player selecting to make a video clip from a portion of the game play, or in response to some other request by the player or another viewer to make a clip of a portion of the event that occurred. In some cases, the event may include more than one player, and the event may show some achievement that was reached by two or more players playing together as team or group, or against other players.

In one embodiment, a player that participated in the event and is associated the generated video clip (e.g., digital media) of the event may wish to share the event with others. However, if the event shows content that is unique, the digital media may be shared by people that are unrelated to the event and may even profit from showing the event online or some other form. To protect the player-creator of the digital media, the player may decide to generate a non-fungible token (NFT) for the digital media. An NFT of the digital media is an encrypted or protected tokenization of the digital media associated with the NFT. An NFT provides the owner of the NFT a way to validate the authenticity of the digital media and further enables the NFT to be sold or traded in accordance with rules established for the NFT.

In one embodiment, a method is provided to enable an NFT of a digital media created by a player to be fractionalized. In one embodiment, when the NFT is created, the creator of the NFT sets the number of fractional shares associated with the NFT. The fractional shares, in one embodiment, can be set to any number of shares and each share can have different percentages. In another embodiment, the number of shares is tied to the participants of the event that produced the digital media. For example, if a set of three players were part of a team that conquered a goal, each of those players would be assigned a fractional share of the NFT associated with the event. In some embodiments, followers or viewers that watched the event live or when it happened could be assigned a fractional NFT as a reward for being present when the event occurred.

In some cases, these fractional NFTs can have intrinsic value to the holder and others that notice the holder having a fraction. For example, a holder of a fractional share of an NFT can receive a unique image that identifies fractional ownership in an NFT. The unique image or symbol can be displayed in a user/player's profile or shown when the player is playing a live game or followers/spectators are watching. The image symbolizing the NFT can, in one embodiment, work like a trophy in the gaming world. In some embodiments, the fractional shares of an NFT can be sold or traded, and each trade or sale can be tracked. In this manner, if shares of an NFT are traded often, their value can go up intrinsically due to its popularity or desirability by a gaming community, users, people or players. For example, each trade can be tracked and assigned a trade value indicative of the NFT share's popularity or desirability. The NFT image can also have a counter, which shows its popularity score due to a number of trades and/or likes by others.

In one embodiment, a method sharing digital game assets in an online gaming system is provided. The method includes generating a digital asset depicting a gaming event associated with a game. Obtaining a non-fungible token (NFT) for the digital asset. The NFT is stored in a block chain with a reference to a storage location of said digital asset. The method includes fractionalizing said NFT to creating a set of shares of the NFT. Then, assigning a share the NFT to a user of the online gaming system. The share is exchangeable among a community of users of the online gaming system. The method further includes tracking use of each of the set of shares of the NFT and applying a value indicator to each share by the online gaming system. The value indicator is indicative of a level of use of the share within the online gaming system.

In some embodiments, the level of use of each share is associated with a trading metric that identifies trades of the share of the NFT among the community of users of the online game.

In some embodiments, the value indicator is associated to a profile of respective ones of the users, the value indicator providing a visible notification to other users of a possession of said share.

In another embodiment, a method is provided for fractionalizing non-fungible token (NFT) shares for digital game assets. The method includes generating a digital asset depicting a gaming event associated with a game. The method includes obtaining a non-fungible token (NFT) for the digital asset. The NFT is stored in a block chain with a reference to a storage location of said digital asset. The obtaining of the NFT includes instructions or parameters for fractionalizing said NFT. The fractionalizing of the NFT creates a set of shares of the NFT. The method includes assigning a share of the NFT to a user of the online gaming system. The share is exchangeable among a community of users. The method includes tracking use of each of the set of shares of the NFT and applying a value indicator to each share by the online gaming system. The value indicator is indicative of a level of use of the share within the online gaming system. In some embodiments, the NFT share can be traded outside of the online gaming system or community, e.g., can be shared with any user via any communication method, program, social media or private message.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which.

DETAILED DESCRIPTION

The following implementations of the present disclosure provide methods, systems, and devices for enabling the generating of fractionalized non-fungible tokens (NFTs) for digital media. In one embodiment, the digital media is gaming related content, e.g., a recording of a portion of a game or an image associated with a game or event depicted in the game or recording of the game.

In one embodiment, a method is provided to enable an NFT of a digital media created by a player to be fractionalized. In one embodiment, when the NFT is created, the creator of the NFT sets the number of fractional shares associated with the NFT. In other embodiments, the number of fractional shares is set automatically by the system depending on the context of the digital media used to create the NFT. Fractional shares, in one embodiment, can be set to any number of shares and each share can have different percentages. In another embodiment, the number of shares is tied to the participants of the event that produced the digital media. For example, if a set of three players were part of a team that conquered a goal, each of those players would be automatically assigned a fractional share of the NFT associated with the event. In some embodiments, followers or viewers that watched the event live or when it happened could be assigned a fractional NFT as a reward for being present when the event occurred.

In some cases, these fractional NFTs can have intrinsic value to the holder and others that notice the holder having a fraction. For example, a holder of a fractional share of an NFT can receive a unique image that identifies fractional ownership in an NFT. The unique image or symbol can be displayed in a user/player's profile or shown when the player is playing a live game or followers/spectators are watching. The image symbolizing the NFT can, in one embodiment, work like a trophy in the gaming world. In some embodiments, the fractional shares of an NFT can be sold or traded, and each trade or sale can be tracked. In this manner, if shares of an NFT are traded often, their value can go up intrinsically due to its popularity or desirability by a gaming community, users, people or players. For example, each trade can be tracked and assigned a trade value indicative of the NFT share's popularity or desirability. The NFT image can also have a counter, which shows its popularity score due to a number of trades and/or likes by others.

Figure 1:
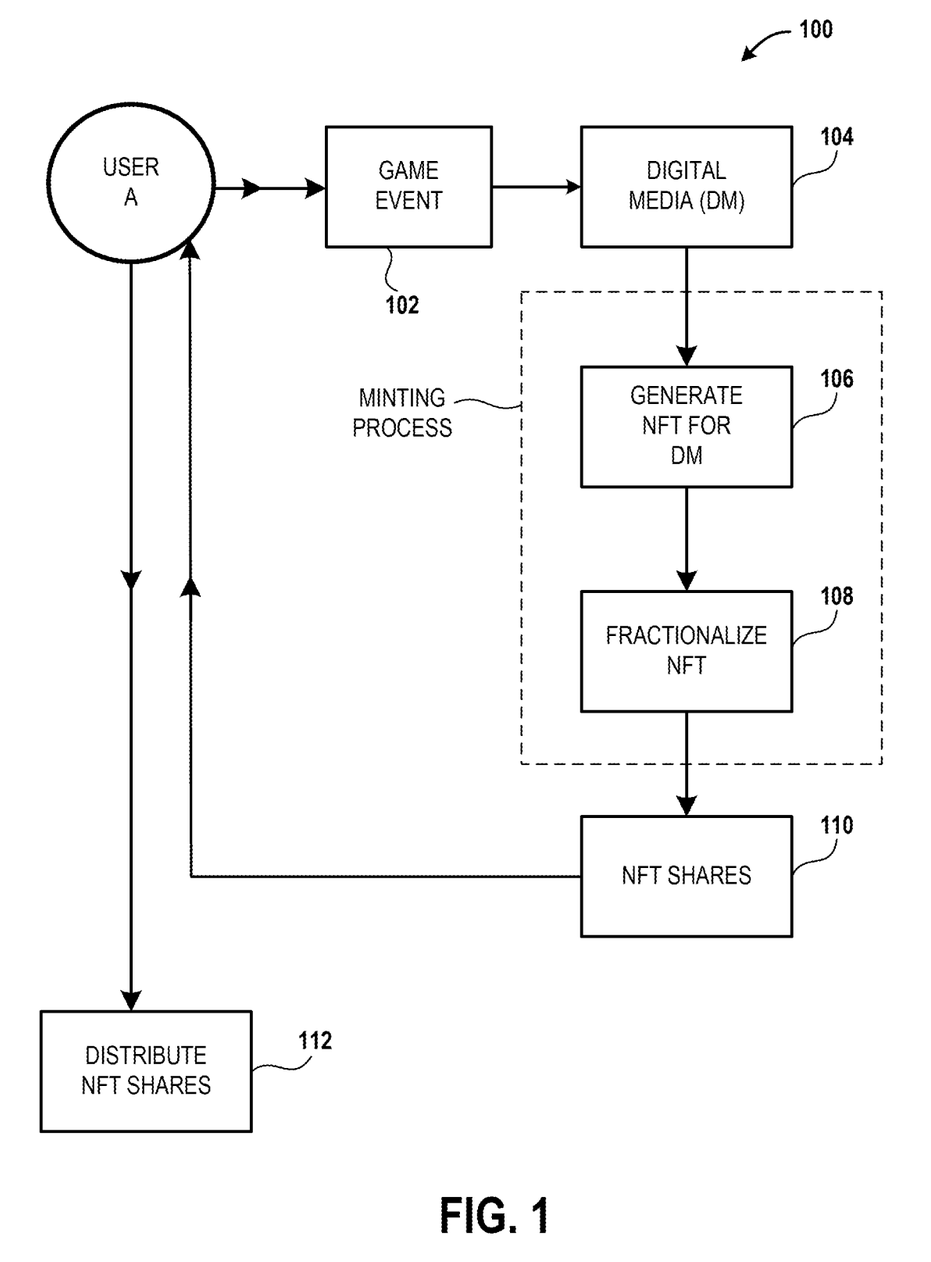
FIG. 1 illustrates an embodiment where a user decides to make an NFT from digital media, and the NFT is fractionalized, in accordance with one embodiment.

FIG. 1 illustrates an embodiment where a user decides to make an NFT from digital media, and the NFT is fractionalized, in accordance with one embodiment. In the example, user A may be playing a game and experience a specific level of game enjoyment, achievement, level, or interest point in the game. A portion of the game can be captured, such as a video clip of the portion of the game that included the moment of interest to the user. In one embodiment, that point of interest in the game that was selected by the user may be related to a game event 102. Once the game event 102 has been captured or created, that piece of content is identified as a digital media (DM) 104 for the game event. The digital media can be in the form of a file, or some other digital format, and may be stored locally on a user's device or remotely on storage that is accessible over the Internet (e.g. cloud storage). Once the digital media 104 has been selected by the user, the user may decide to generate an NFT for the digital media in operation 106.

The generation of an NFT for digital media may include the process of utilizing a digital wallet to enable minting of the NFT. The digital wallet may contain crypto currency, and a digital wallet can be created on numerous websites or on custom websites to enable users to purchase cryptocurrency in order to find the digital wallet to be used for minting an NFT. Generally speaking, minting an NFT is how digital media becomes a part of a public ledger, or blockchain. One such public ledger is the Ethereum blockchain, which is public ledger that is unchangeable and tamper-proof. In one embodiment, minting an NFT to a block chain will also enable the generation of rules or programming to be assigned to the minting process. In one embodiment, custom programming is provided enable an assignment of shares to be created for the NFT.

In some embodiments, a private block chain can be utilized, such as one provided by a gaming system. The private block chain can utilize a private ledger that enables tracking of the minting of NFT's, and associated shares for each NFT. In this manner, and NFT is not a single NFT, but shares of one original NFT. The shares defined the fractionalization of the NFT, and assigned those fractional shares to specific users. As mentioned above, the users can be those associated with the digital media when it was created, e.g. players in a game or spectators in a game, or can be assigned to third-party users that were not part of the content in the digital media. In some embodiments, each recipient of the NFT share can trade the NFT share among friends or sell those NFT shares.

In one embodiment, a tracking mechanism is provided to identify when transactions occur for the NFT shares or level of use, and provide a value associated with those shares being traded. For instance, NFT shares the trade more than others and can be considered more valuable. In some embodiments, unique identifiers can be provided to the graphical representation of the NFT shares, so other people can see the value of those NFT shares. In some embodiments, the unique identifiers can be in the form of graphical user interface icons or images. Value indicators can be provided in the form of numbers identifying tallies associated with their use, trades, likes, interest comments, etc.

Once the fractionalization 108 of the NFT has occurred, those fractional NFT shares 110 are associated to the user that created the NFT. By way of example, the creator of the fractionalized NFT can be identified with each share, even if those shares are distributed 112 to other users by the original creator. In some embodiments, as will be described below, the distribution of NFT shares can be done automatically by a system that identifies who is entitled to those NFT shares, once an NFT that's been fractionalized is created.

Figure 2:
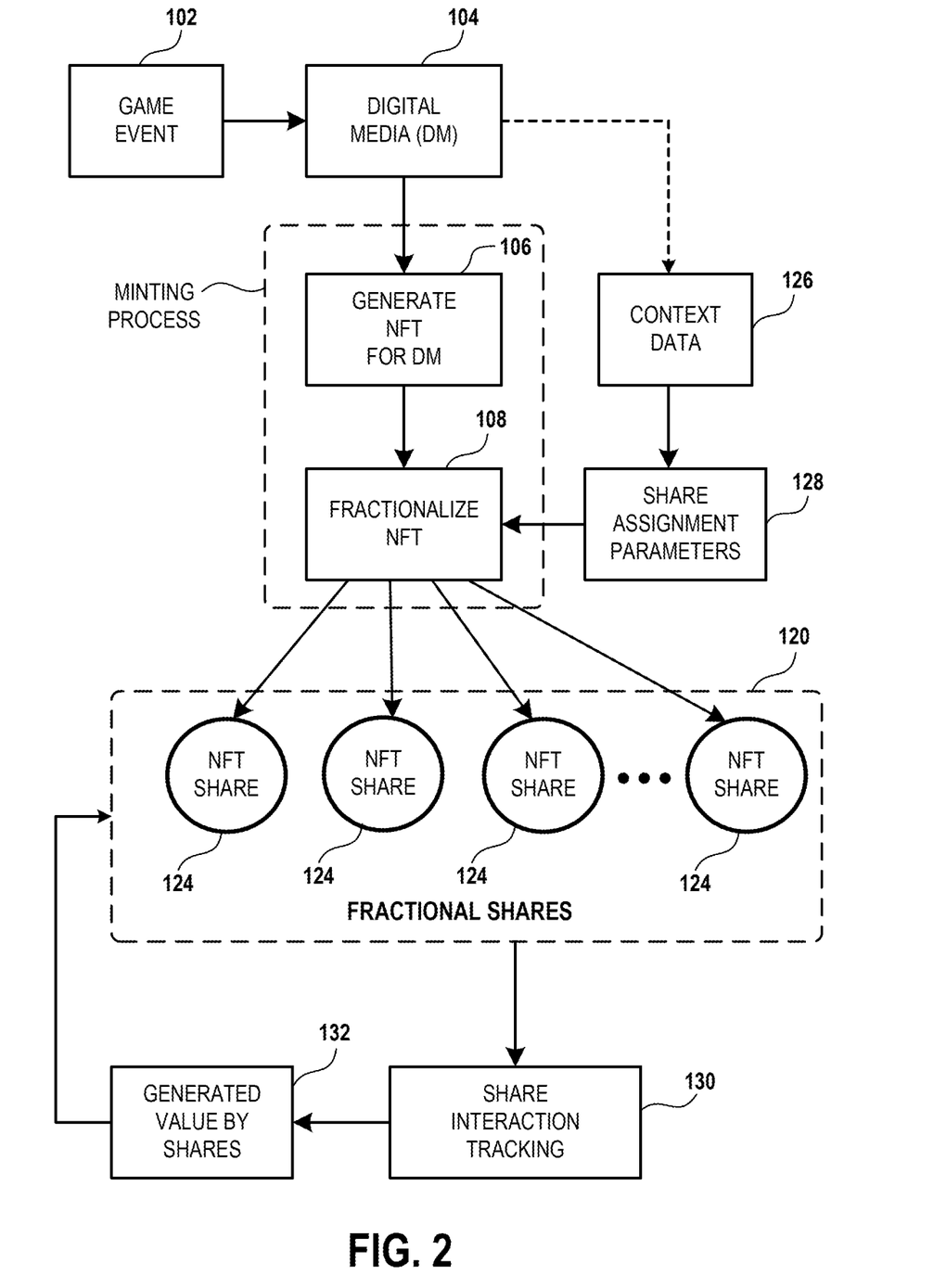
FIG. 2 illustrates an example of a game event 102 selected by one or more users, in accordance with one embodiment.

FIG. 2 illustrates an example of a game event 102 selected by one or more users. The users can select the NFT events from online games, or console games that are not online, or from streaming games that are viewable by multiple spectators. The types of game events that can occur are many, and identification of those significant game events can include logic for identification of significant game events. By way of example, if a score is achieved in a specific game that is higher than expected or higher than scores achieved by community members, that achievement can be automatically identified. In other embodiments, the identification of a significant event can be done by one or more of the gaming players. Once the digital media (DM) 104 has been identified and selected by one or more users, that DM 104 can be utilized for generation of an NFT 106.

As mentioned above, generation of the NFT for the DM can include programming instructions that identify that NFT as one that will get fractionalized 108. In one embodiment, depending on the context of the gaming events occurring in the digital media 104, context data 126 is automatically produced. In one embodiment, machine learning is utilized to examine gaming data that occurred in the game event 102 that is embodied in the digital media 104. Machine learning can identify significant events, characters, game levels, interactions, chat, historical performance, and other metrics. The context data 126 can then be used to produce share assignment parameters 128. The share assignment parameters 128 can be in the form of code, instructions, or rules that are usable by the fractionalized NFT 108 process. For example, if the context data 126 identified a very significant game event 102 where players achieved a noteworthy goal, the share assignment parameters 128 can identify the players and the spectators present for that event. In one embodiment, the fractionalized NFT 108 process can automatically generate fractionalized NFT shares 120, where each of the players and each of the spectators present for that significant event are assigned NFT shares 124.

Once the NFT shares 124 are assigned to the specific users that were either playing the game event or viewing the game event as spectators, share interaction tracking 130 is utilized to identify interactions of each individual NFT share 124. By way of example, some users may decide to trade the NFT share 124 with a friend, while others may decide to keep the NFT share 124 and utilize it like a trophy that can be displayed showing how the player or user was present during that significant event. In some embodiments, users or players that may show their ownership of their NFT share 124 utilizing an icon or graphic associate with their profile (e.g. similar to trophies), may additionally show information that identifies the generated value for their respective share.

For instance, if a share has been liked often, or traded often, or sold often, or sold for a high price, that information can be used to gauge and assign a generated value to the specific NFT share 124 in operation 132. Accordingly, each NFT share 124 will maintain its own historical value and interaction metric, as that NFT share lives independent of other NFT shares while at the same time being part of a single game event 102 that produced the digital media 104 and was rendered into a fractionalized NFT.

Figure 3:
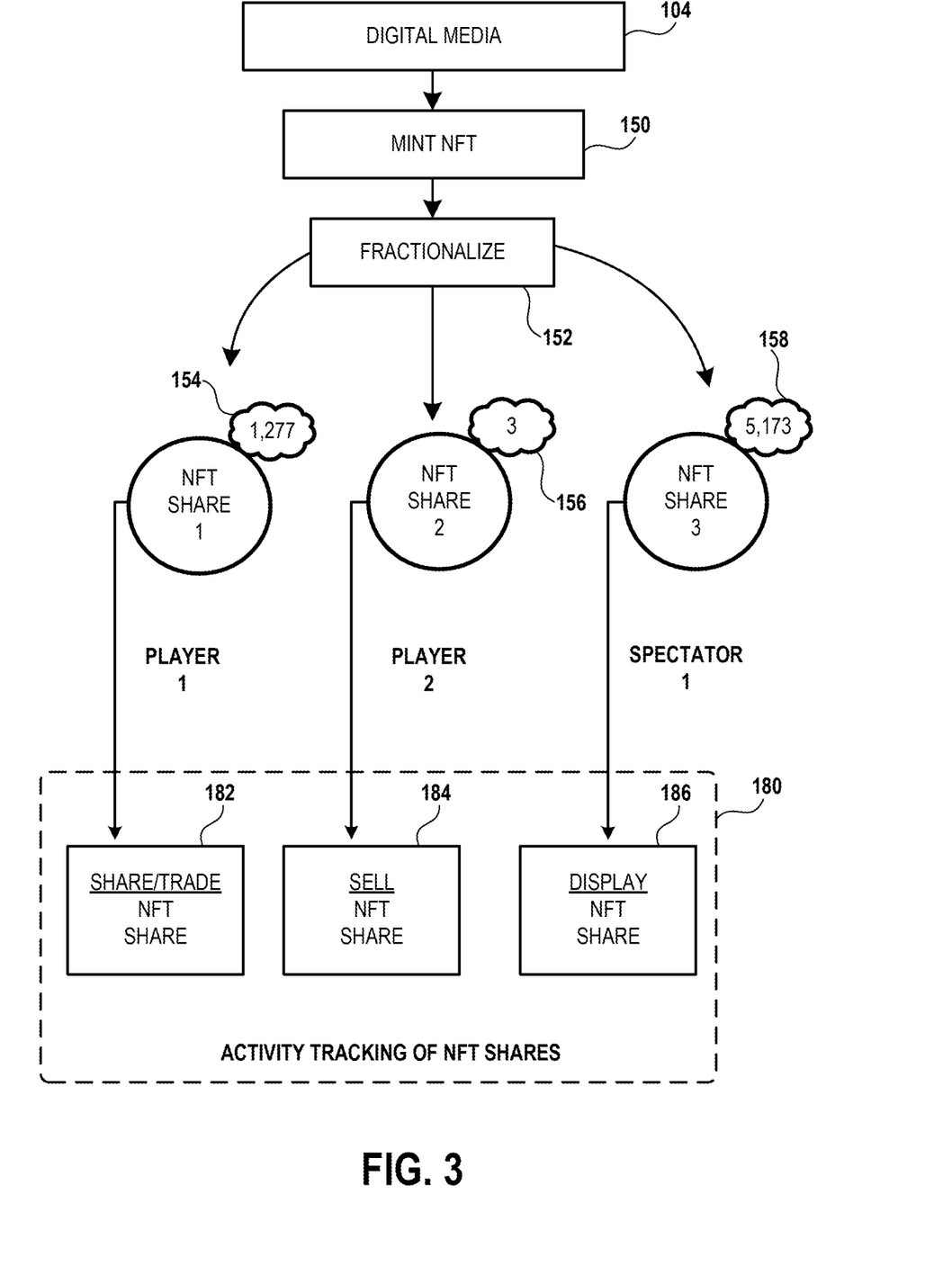
FIG. 3 illustrates an example of having fractionalized NFT shares that individually will be associated with value indicators, in accordance with one embodiment.

FIG. 3 illustrates an example of having fractionalized NFT shares that individually will be associated with value indicators, in accordance with one embodiment. The digital media 104 is first selected and then minted 150. As noted above, the minting process can occur using a publicly available ledger/block chain or a private ledger/block chain. In one embodiment, the minting process will enable coding for setting the fractionalization data in operation 152. The fractionalization data is the code that sets the share assignment parameters. The share assignment parameters identify how many shares are to be assigned to different users or players or spectators. In some embodiments, this code can assign different values to each of the NFT shares.

Thus, it is not necessary for every NFT share to have the same value. For example, players in the digital media may receive a higher value for their NFT shares while spectators made correspondingly share lower value NFT shares. As one example, if there are two players in the digital media as identified by the context data 126, each of the two players may receive 25 percent of the NFT, while 10 spectators may each receive a 5 percent share of the NFT. Altogether, there could be 12 NFT shares generated during the fractionalization 108. As should be understood, this is only one example of the way the fractionalization can occur, and the actual values assigned to each NFT share and the number of shares generated will depend on the code utilize for identifying what to do with the context data 126 or based on what a creator user decides to fractionalized NFT. For instance, if there is a single primary player that decides to make the digital media 104, that single primary player may decide to fractionalized the NFT into a creator share that is 51 percent or greater to maintain control of the NFT, and allow for a distribution of the 49 percent of the share to any number of spectators that may be present or rooting for the creator.

In some embodiments, large numbers of spectators may be present, and the number of NFT shares generated for spectators may be large, but can still be individually tracked for identification of value for each of the NFT shares. In the example of FIG. 3, player one and player two will receive an NFT share and a spectator will also receive an NFT share. Player one is a very active player in the gaming community, while player two is less active. In this example, spectator one is also a very active spectator. Activity tracking of the NFT shares 180 will occur over time, as each of the players or users or spectators utilize the NFT shares in the gaming environment, social media, or private sharing or sales. The NFT shares can be tracked for sharing among users or players, trades, sales, number of display or impressions, number of likes, number of comments associated with the NFT share, number of views, etc. As shown, the activity tracking of NFT shares 180 can include share or trading tracking 182, sales tracking 184, display tracking 186. These are only some examples of the type of tracking that is possible when users of the NFT shares interact with NFT shares in the gaming environment or outside of the game environment.

For illustration purposes, a graphical icon 156 illustrates that NFT share 1 has a value of 1277, graphical icon 156 illustrates that NFT share 2 has a value of 3, and graphical icon 158 illustrates that NFT share 3 has a value of 5173. These value indicators can be a combination of metrics associated with their use of the NFT. As mentioned above, the metrics can include the number of displays or impressions while users play a game (similar to trophies), the number of likes of the NFT share, the number of views of the digital media underlined NFT share, the number of comments associated with the digital media underlined NFT share, the clicking on the NFT share, the liking of NFT share, or some interaction with the media content that underlies NFT share. This example illustrates how NFT shares once created can live independent of other NFT shares, but are still tied to their original digital media 104, and will provide independent access to the digital media for viewing, commenting and the like as it relates to the game event 102 utilize to make the digital media 104.

Figure 4:
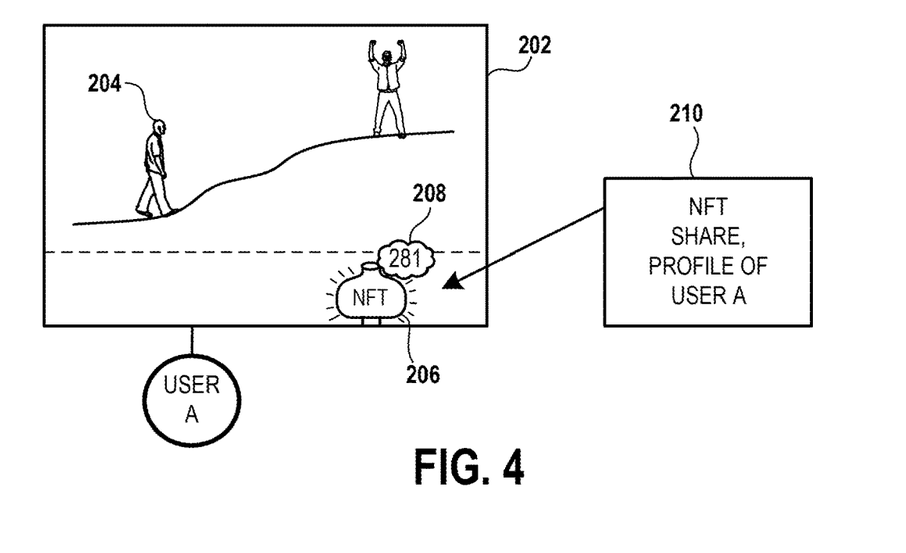
FIG. 4 illustrates an example of an NFT share 206 which is displayed in some format on a screen while the user A plays a game 202, in accordance with one embodiment.

FIG. 4 illustrates an example of an NFT share 206 which is displayed in some format on a screen while the user A plays a game 202, in accordance with one embodiment. In this illustration, user A is controlling player 204 in the videogame, and that gameplay may be independent of the game event or digital media associated with the NFT 206. In other embodiments, the NFT 206 is automatically displayed during the game if the NFT share was earned or obtained in relation to the same game being played. In this manner, if the user A has an NFT share 206 that relates to game 202, the system will automatically access the NFT share icon or graphic from the users profile and display it for other users watching as spectators to see how the user A performs in the game.

In some embodiments, multiple NFT shares can be displayed during gameplay to illustrate the player strength, popularity, or skill level. Surfacing of NFT shares on the display can be performed automatically as mentioned above, or the user can decide to show their NFT shares while gameplay is occurring. In some embodiments, the NFT share 206 can be displayed as an icon when the player reaches a point in the game that relates to content that let the player obtained NFT share, whether the share was obtained by playing the game or by spectating the game and that scenario occurring in the game.

Figure 5:
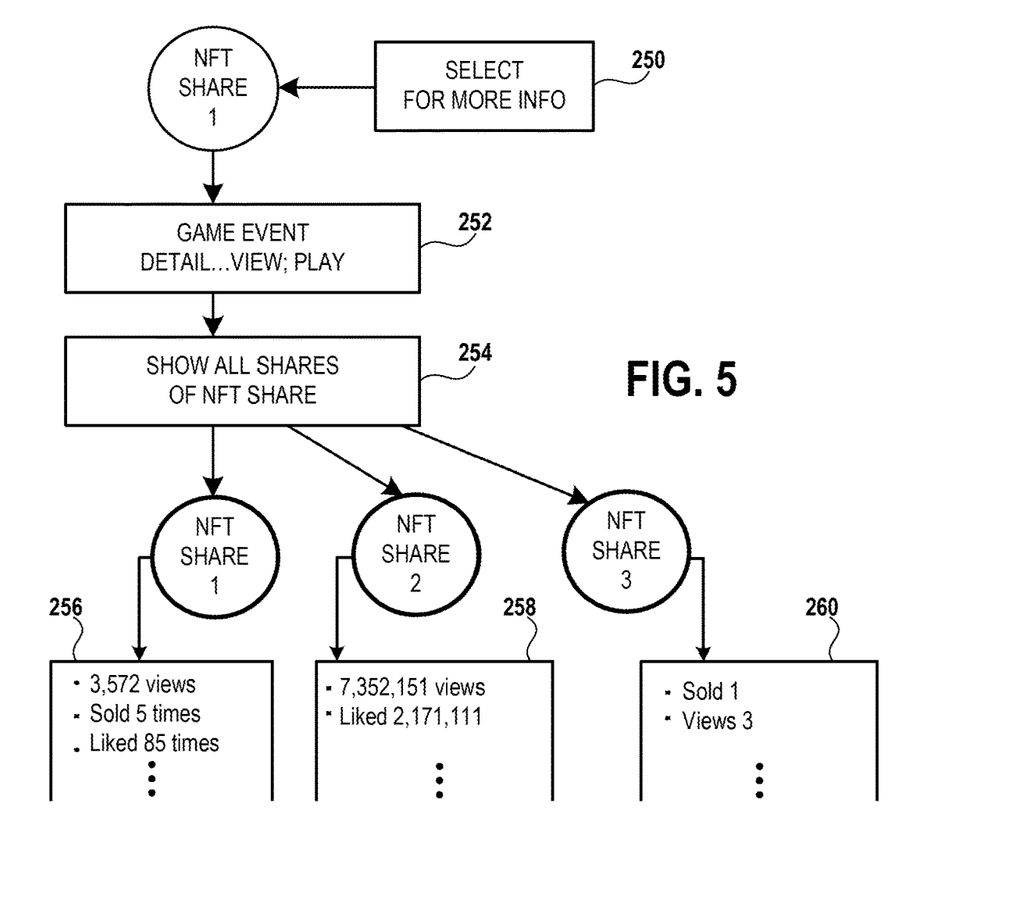
FIG. 5 illustrates an embodiment where an NFT share can be selected by a third-party, e.g. a spectator or social media viewer to identify details about the NFT share, in accordance with one embodiment.

FIG. 5 illustrates an embodiment where an NFT share can be selected by a third-party, e.g. a spectator or social media viewer to identify details about the NFT share. For example, a spectator may see the NFT share displayed while a player is playing a game, and the spectator may wish to understand the significance of the NFT share. Upon selection for more information 250, details 252 can be provided such as game event, details of the game event, views of the game event, or allow the user to replay the game event to appreciate the significance of the NFT share. In some embodiments, if a user selects to view NFT share 1, the user may wish to understand the significance of that share and how many other shares were generated for that event. In operation 254, all other shares of the fractionalized NFT can be displayed when a third party or viewer wishes to understand more about the NFT share and/or at significance.

In one embodiment, all shares may be selectable and their associated information regarding value can be displayed. In this example, each share will have display data 256, 258, and 260. This display data can identify how much more valuable one NFT can be relative to another or how often that NFT has been shared, commented on, viewed, displayed, or the like. In one embodiment, when value changes for the NFT shares, this information can be batched and then minted back to the NFT share to provide a persistent record of the value of the NFT share. In some embodiments, additional minting can be done instantaneously when new value data has been produced for the NFT share. In some embodiments, additional minting will be done periodically when additional or batched value data has been collected for the NFT share for efficiency.

Figure 6:
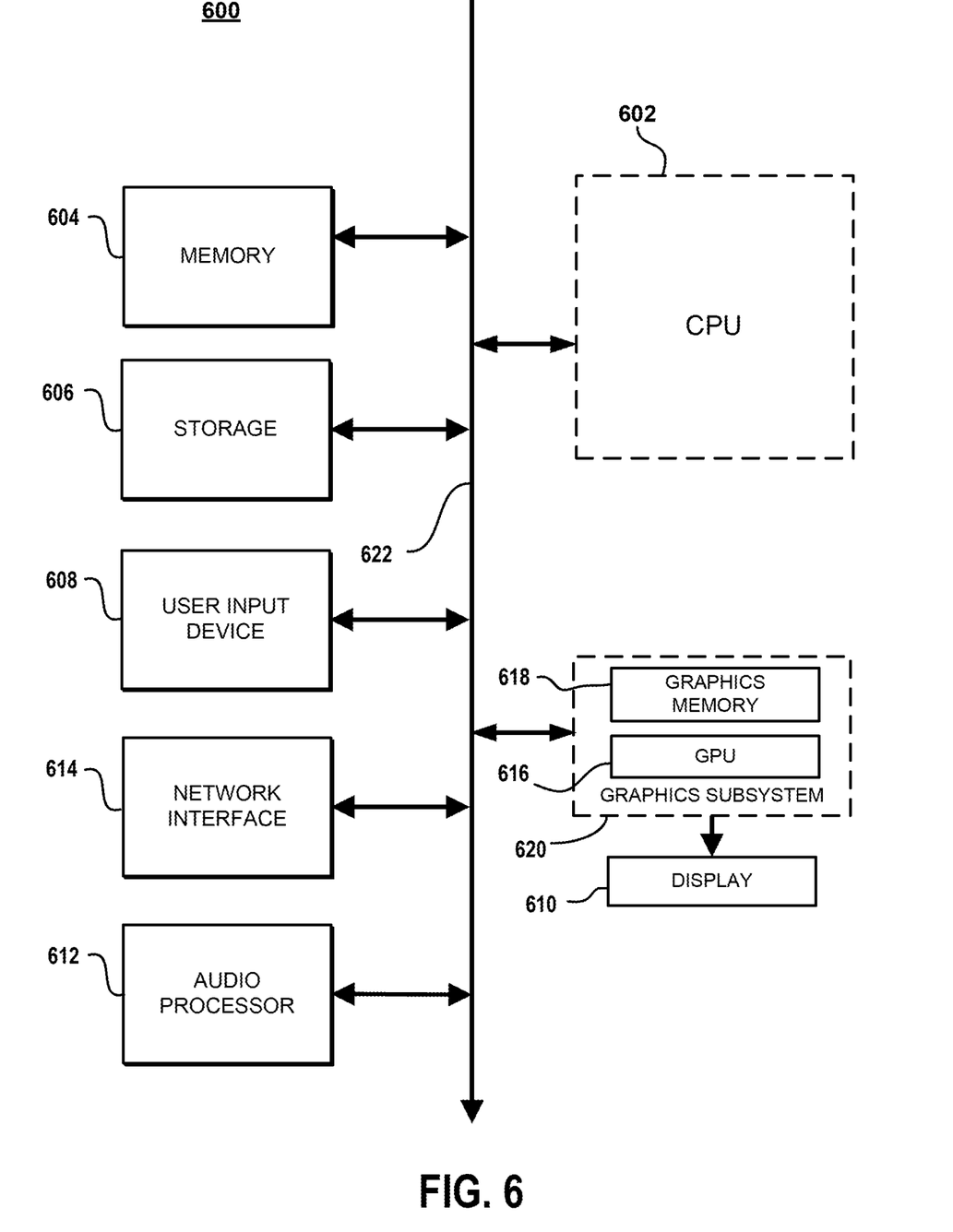
FIG. 6 illustrates components of an example device that can be used to perform aspects of the various embodiments of the present disclosure.

FIG. 6 illustrates components of an example device 600 that can be used to perform aspects of the various embodiments of the present disclosure. This block diagram illustrates a device 600 that can incorporate or can be a personal computer, video game console, personal digital assistant, a server or other digital device, suitable for practicing an embodiment of the disclosure. Device 600 includes a central processing unit (CPU) 602 for running software applications and optionally an operating system. CPU 602 may be comprised of one or more homogeneous or heterogeneous processing cores. For example, CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 600 may be a localized to a player playing a game segment (e.g., game console), or remote from the player (e.g., back-end server processor), or one of many servers using virtualization in a game cloud system for remote streaming of gameplay to clients.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600, including CPU 602, memory 604, data storage 606, user input devices 608, network interface 610, and audio processor 612 are connected via one or more data buses 622.

A graphics subsystem 620 is further connected with data bus 622 and the components of the device 600. The graphics subsystem 620 includes a graphics processing unit (GPU) 616 and graphics memory 618. Graphics memory 618 includes a display memory (e.g., a frame buffer) used for storing pixel data for each pixel of an output image. Graphics memory 618 can be integrated in the same device as GPU 608, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 614 periodically outputs pixel data for an image from graphics memory 618 to be displayed on display device 610. Display device 610 can be any device capable of displaying visual information in response to a signal from the device 600, including CRT, LCD, plasma, and OLED displays. Device 600 can provide the display device 610 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation may be produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for sharing digital game assets in an online gaming system, comprising:

generating a digital asset depicting a gaming event associated with a game, the gaming event is identified to have significance in a context of the game over other gaming events;

obtaining a non-fungible token (NFT) for the digital asset, the NFT being stored in a block chain with a reference to a storage location of said digital asset;

fractionalizing said NFT, the fractionalizing creating a set of shares of the NFT;

assigning a share the NFT to a user of the online gaming system, the share being exchangeable among a community of users of the online gaming system;

tracking use of each of the set of shares of the NFT; and applying a value indicator to each share by the online gaming system, the value indicator being indicative of a level of use of the share within the online gaming system, the value indicator is a visible notifier that is associated with a profile of the user of the online gaming system and provides contextual relation to the game event that is identified to have significance.

2. The method of claim 1, wherein the level of use of each share is associated with a trading metric that identifies trades of the share of the NFT among the community of users of the online game.

3. The method of claim 1, wherein the user that is assigned the share of the NFT is identified to have been a spectator the gaming event.

4. The method of claim 3, further comprising, assigning shares of the set of shares to only spectators of the gaming event.

5. The method of claim 1, wherein one or more additional digital assets are generated during the game, and each additional digital asset representing an additional gaming event having significance.

6. The method of claim 1, wherein the generating of the digital asset and obtaining the NFT for the digital asset is process automatically based on an identification of significance for the gaming event during play of the game.

7. The method of claim 6, wherein the fractionalizing of said NFT into said set of shares is processed automatically, and each of said set of shares is assigned to one or more spectators that were spectating when the gaming event occurred.

8. A method for fractionalizing non-fungible token (NFT) shares for digital game assets, comprising:
 generating a digital asset depicting a gaming event associated with a game, the gaming event is identified to have significance in a context of the game over other gaming events;
 obtaining a non-fungible token (NFT) for the digital asset, the NFT being stored in a block chain with a reference to a storage location of said digital asset, the obtaining of the NFT includes instructions for fractionalizing said NFT, the fractionalizing creating a set of shares of the NFT;
 assigning a share the NFT to a user of an online gaming system, the share being exchangeable among a community of users;
 tracking use of each of the set of shares of the NFT; and
 applying a value indicator to each share by the online gaming system, the value indicator being indicative of a level of use of the share within the online gaming system, the value indicator is a visible notifier that is associated with a profile of the user of the online gaming system and provides contextual relation to the game event that is identified to have significance.

9. The method of claim 8, wherein the level of use of each share is associated with an interaction metric that identifies independent use of each share of the NFT.

10. The method of claim 8, wherein the user that is assigned the share of the NFT is identified to have been a player or a spectator the gaming event.

11. The method of claim 10, further comprising, assigning shares of the set of shares to only spectators of the gaming event, the share of the NFT being linked to profiles of each user and the share is identified with a significance identifier.

12. The method of claim 8, wherein one or more additional digital assets are generated during the game, and each additional digital asset representing an additional gaming event having significance.

13. The method of claim 8, wherein the generating of the digital asset and obtaining the NFT for the digital asset is process automatically based on an identification of context data from the gaming event during play of the game using a machine learning model.

14. The method of claim 8, wherein the fractionalizing of said NFT into said set of shares is processed automatically, and each of said set of shares is assigned to one or more spectators that were spectating when the gaming event occurred.

15. The method of claim 8, wherein the fractionalizing of said NFT into said set of shares is processed automatically, and each of said set of shares is assigned to one or more of players and spectators that were present during the gaming event.

* * * * *